United States Patent

[11] 3,573,521

[72] Inventors Chester C. Carson
Ballston Spa;
Gerd E. Krulls, Scotia, N.Y.
[21] Appl. No. 16,648
[22] Filed Mar. 5, 1970
[45] Patented Apr. 6, 1971
[73] Assignee General Electric Company

[54] CONDUCTOR BLADE FOR A LIQUID METAL COLLECTOR
4 Claims, 3 Drawing Figs.
[52] U.S. Cl. .................................................. 310/219
[51] Int. Cl. .................................................. H02k 29/00
[50] Field of Search .......................................... 310/219, 227, 232, 178

[56] References Cited
UNITED STATES PATENTS
3,191,082  6/1965  Csillag ........................ 310/227X Primary Examiner—D. F. Duggan
Assistant Examiner—B. A. Reynolds
Attorneys—William C. Crutcher, Bryan C. Ogden, Frank L. Neuhauser, Oscar B. Waddell and Joseph B. Forman ABSTRACT: A liquid metal collector of the type having a stationary conductor blade immersed in a rotating volume of liquid metal has improved electrical characteristics through the incorporation of a circumferential groove which is positioned in the conductor blade so as to provide a relatively quiescent area of liquid metal. An annular pad of molybdenum may be positioned in the groove in order to further enhance the electrical characteristics of the liquid metal collector.

Patented April 6, 1971
3,573,521
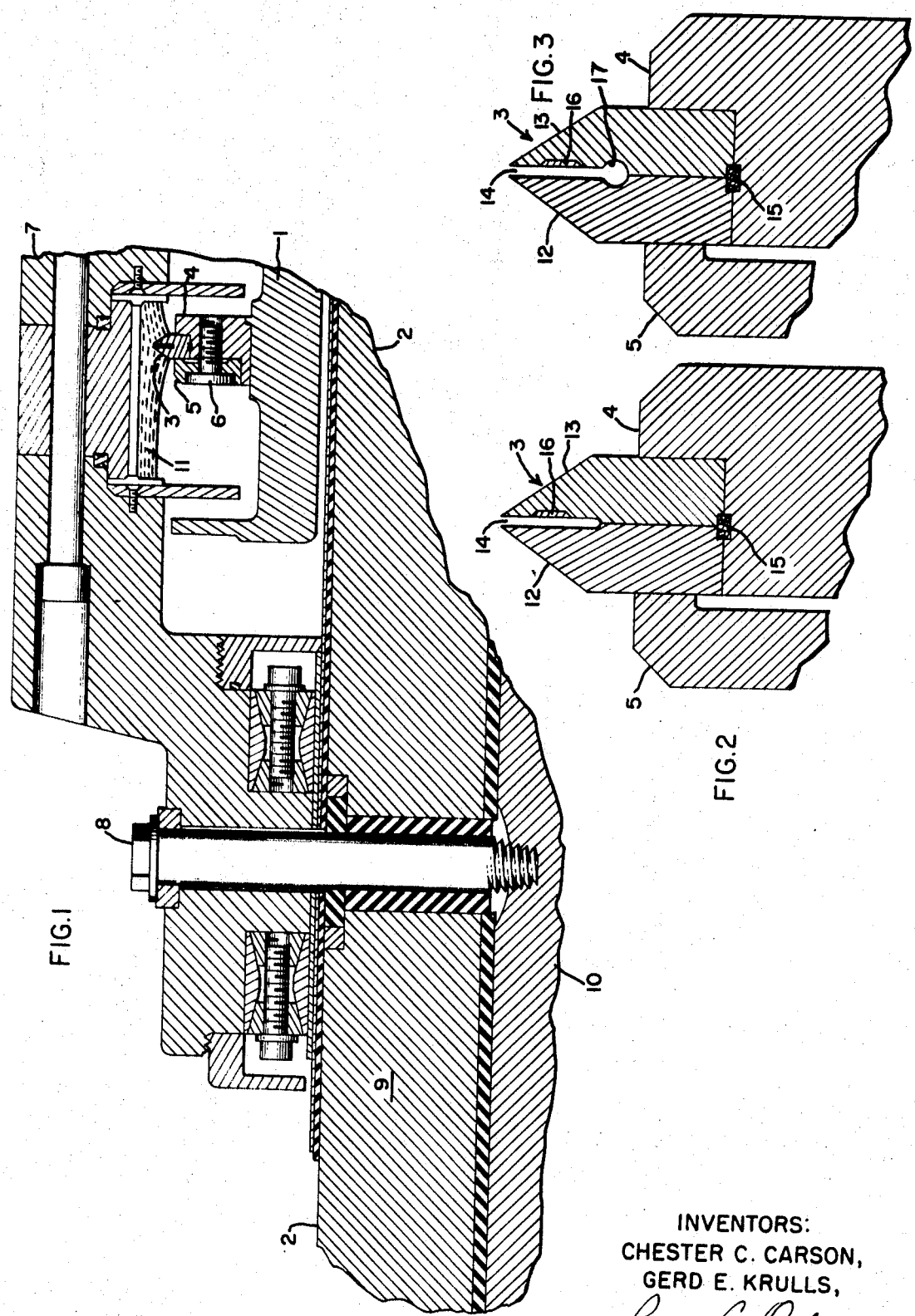
INVENTORS:
CHESTER C. CARSON,
GERD E. KRULLS,
BY Bryan C. Ogden
THEIR ATTORNEY.

CONDUCTOR BLADE FOR A LIQUID METAL COLLECTOR

BACKGROUND OF THE INVENTION

The present invention relates generally to liquid metal collectors for use in dynamoelectric machines and more particularly to an improvement of the electrical characteristics of the stationary conductor blade which serves to transmit current from a source to the liquid metal.

Liquid metal collectors of the rotating cup variety have been suggested for large dynamoelectric machines to provide a path for the DC excitation current from the exciter to the field windings of the rotating element. An example of such a collector may be seen by reference to U.S. Pat. No. 3,444,408 issued May 13, 1969 to G. E. Krulls and assigned to the assignee of the present invention. With the high currents required for the field windings of today's dynamoelectric machines of high ratings, it is generally accepted that carbon brushes no longer provide the best means for conducting the current to the field windings. In a liquid metal collector of the rotating cup variety, the large currents required may be readily transmitted by immersing a stationary annular conductor blade in the rotating liquid metal.

One of the problems when utilizing a liquid metal collector with such a configuration is to establish good electrical contact between the rotating liquid metal and the stationary conductor blade. It is desirable to have the voltage drop across the conductor blade and liquid metal as low as possible, primarily to reduce power losses but also to diminish the probability of a chemical reaction and the deposition of any undesirable matter on the immersed surface of the conductor blade. The possible consequences of such a chemical reaction or deposition of undesirable matter could be a higher voltage drop and/or significant removal of blade material. Ideally, the contact between the blade and the liquid metal, which is usually mercury, should be that between a clean metal surface and a body of liquid metal which is either at rest or which present the same area for contact as if it were at rest. As previously mentioned, the liquid metal is in motion during operation over the surface of the conductor blade, thus resulting in a low effective contact area for the flowing current (increasing the electrical resistance) which in turn causes a relatively high voltage drop.

In the past, the consequences of allowing these problems to remain have been accepted. For the resulting reduction in power, an initially higher excitation current was required. When a chemical reaction attended by erosive forces caused a diminution in the blade material to a significant extent, the conductor blade was necessarily replaced which required a shutdown of the machine.

Accordingly, from the foregoing, the primary object of the present invention is to improve the electrical conducting characteristics between the conductor blade and the rotating liquid metal.

Other objects, advantages and features of the present invention will become apparent from the following description of one embodiment thereof when taken in connection with the accompanying drawing.

SUMMARY OF THE INVENTION

Briefly stated, the present invention is practiced in one form by providing the annular conductor blade of a rotating cup-type liquid metal collector with a continuous circumferential groove extending inwardly from the periphery thereof. With such a provision in the conductor blade, the liquid metal which flows into the groove will be moving at a speed relative to the blade which is greatly reduced compared to its speed over the exterior blade surfaces.

BRIEF DESCRIPTION OF THE DRAWING

FIG. 1 is a partial view in section of the liquid metal collector showing the environment of the conductor blade that incorporates the present invention.

FIG. 2 is an enlarged view in section of the conductor blade showing the present invention.

FIG. 3 is another view of a conductor blade in section which incorporates an alternate embodiment of the present invention.

DESCRIPTION OF THE PREFERRED EMBODIMENT

Referring now to FIG. 1, the overall liquid metal collector is partially shown and is comprised basically of a stationary conductive member 1 which extends circumferentially about the rotatable shaft 2. It is conductive member 1 which communicates with a source of DC current (not shown) which ultimately develops the electromagnetic field of the dynamoelectric machine. Secured about the periphery of the stationary conductive member 1 is the annular conductor blade 3 and its associated mounting member 4. The mounting member 4 is securely attached to the stationary member 1, while the conductor blade 3 is in turn securely held in place by the clamping means comprising circumferential clamp 5 which is bolted to the mounting member 4 through bolts 6. It will be appreciated that the clamp 5 may be removed for the inspection and replacement, if necessary, of the annular conductor blade 3.

Generally surrounding the annular conductor blade 3 on three sides is the rotatable cup member 7 which is securely attached to the rotatable shaft 2. The rotatable cup member 7, of course, is an electrically conductive piece through which the conductive stud bolts 8 extend radially inward and through an exterior portion 9 of the shaft 2 to the field conductor bars 10. The stud bolts 8 are electrically insulated from the exterior portion 9 of shaft 2 so that the excitation current will be properly directed to the field windings.

Within the rotatable cup member 7 there is formed during operation a volume of rotating liquid metal indicated as 11. The conductor blade 3 is partially immersed in liquid metal 11 and it is the liquid metal 11 which is in motion relative to blade 3.

Turning now to a description of FIG. 2, the details of the conductor blade 3 and the present invention are shown. The conductor blade 3 which is positioned on mounting member 4 is shown as being comprised of two separate circumferential rings 12, 13 juxtaposed to one another so as to define a deep (depth dimension on the order of five times the width dimension) circumferential groove or slot 14 which extends radially inward from the periphery of conductor blade 3. An O-ring is indicated at 15 where the two rings 12, 13 are sealed together. Although an O-ring is shown, a circumferential seal weld would serve the same purpose.

The conductor blade 3 is also shown as having an annular pad of molybdenum metal 16 positioned in ring 13 on one side of the groove 14. The circumferential conductor blade 3 will usually be constructed of stainless steel and the addition of the molybdenum, or other suitable metal, pad 16 will increase the current conducting characteristics between the stainless steel and the liquid metal, which, as previously mentioned, is usually mercury.

Under operating conditions, the groove 14 would be either substantially or totally filled with liquid metal due to the conversion of velocity head to pressure head caused by slowing down of the metal which acts to force the liquid metal into the slot. The relative velocity of the liquid metal to the conductor blade 3 will decrease proportionately as the distance from the opening of slot 14 in the blade 3 increases to the bottom of the slot. Depending upon the width of the slot 14, the relative velocity would become negligible, or virtually zero, at the bottom or innermost portion of the slot, thereby resulting in an electrical contact between a relatively quiescent body of liquid metal and a metal surface which would be under conditions favorable to the maintenance of a clean surface.

Referring now to FIG. 3 wherein an alternate embodiment is shown, it is seen that the circumferential groove 14 widens into a relatively wide annular channel 17. The channel 17 is positioned at a point from the periphery of the blade 3 at which the velocity of the liquid metal becomes negligible, thus providing a large amount of surface area where the liquid metal-conductor blade contact will provide excellent electrical characteristics with a very low voltage drop.

OPERATION OF THE INVENTION

The direction of the DC current is through the stationary conductive member 1, through the mounting member 4, through the annular conductor blade 3, through the liquid metal 11, through the rotatable cup member 7, and thence through the conductive stud bolts 8 to the field conductor bars 10. When the liquid metal fills the circumferential groove 14 and forms a relatively quiescent area which provides good electrical contact with the conductor blade 3, a low voltage drop will occur across the contact area. In the area where the liquid metal is relatively still, the surface of the groove 14 will be maintained in a clean condition such that chemical reactions and subsequent loss of blade material will not occur. If the molybdenum annular pad is incorporated in the conductor blade and if the liquid metal is in fact liquid mercury, the voltage drop from the conductor blade 3 to the liquid mercury will be reduced even more which, of course, will result in a much lower power loss.

Thus it will be appreciated that an improved conductor blade has herein been described which represents an advance in the art such that power losses in the conduction of field current from its source to the field windings is at a minimum, while at the same time the material loss in the conductor blade is minimized due to the maintenance of clean surfaces.

It may occur to other of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

We claim:

1. A liquid metal collector for dynamoelectric machines of the type having a rotatable cup member containing a quantity of electrically conductive liquid metal, a stationary member on which there are means to mount a circumferential conductor blade so constructed and arranged as to be partially immersed in the rotating liquid metal during operation and having the following improvement comprising:

at least one circumferential groove having a depth at least three times its width and extending radially inward from the blade periphery, arranged and adapted so that the opening of the groove is immersed in the rotating liquid metal while the liquid metal entering into and toward the bottom of the groove is in a quiescent state, thereby increasing electrical conducting characteristics.

2. A liquid metal collector as in claim 1 further comprising an annular molybdenum pad positioned on one side of the groove in order to further improve electrical conducting characteristics.

3. A liquid metal collector as in claim 1 including an annular enlarged channel into which the groove opens, providing a larger area for increased contact between the quiescent liquid metal and the conductor blade.

4. A liquid metal collector for dynamoelectric machines of the type having a rotatable cup member containing a quantity of electrically conductive liquid metal, a stationary member on which there are means to mount a circumferential conductor blade so constructed and arranged as to be partially immersed in the rotating liquid metal during operation and having the following improvement comprising:

at least one circumferential groove having a depth at least three times its width and extending radially inward from the blade periphery, arranged and adapted so that the opening of the groove is immersed in the rotating liquid metal while the liquid metal entering into and toward the bottom of the groove is in a quiescent state, thereby increasing electrical conducting characteristics, an annular molybdenum pad positioned on one side of the groove in order to further improve electrical conducting characteristics; and an annular enlarged channel into which the groove opens, providing a larger area for increased contact between the quiescent liquid metal and the conductor blade.